US011326676B2

(12) United States Patent
Ozawa et al.

(10) Patent No.: US 11,326,676 B2
(45) Date of Patent: May 10, 2022

(54) POWER UNIT OF UTILITY VEHICLE

(71) Applicant: KAWASAKI JUKOGYO KABUSHIKI KAISHA, Kobe (JP)

(72) Inventors: Shouji Ozawa, Kakogawa (JP); Yoshimoto Matsuda, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 265 days.

(21) Appl. No.: 16/554,899

(22) Filed: Aug. 29, 2019

(65) Prior Publication Data

US 2021/0062901 A1 Mar. 4, 2021

(51) Int. Cl.
*F16H 37/02* (2006.01)
*F16H 37/08* (2006.01)
*F16H 61/684* (2006.01)
*F16H 55/17* (2006.01)

(52) U.S. Cl.
CPC ......... *F16H 37/084* (2013.01); *F16H 37/021* (2013.01); *F16H 61/684* (2013.01); *F16H 2055/178* (2013.01)

(58) Field of Classification Search
CPC .............................. F16H 37/021; F16H 37/023
See application file for complete search history.

(56) References Cited

U.S. PATENT DOCUMENTS 2,621,545 A * 12/1952 Karig .................... F16H 37/021
    74/745
3,442,346 A * 5/1969 Mann .................... B60K 17/08
    180/53.1
8,613,336 B2    12/2013 Deckard et al.

* cited by examiner

*Primary Examiner* — William C Joyce
(74) *Attorney, Agent, or Firm* — Alleman Hall Creasman & Tuttle LLP

(57) ABSTRACT

A power unit of a utility vehicle includes a power source for travel of the utility vehicle, a continuously variable transmission, a gear transmission, a first clutch, a second clutch, and an output mechanism. The gear transmission includes a first GT input shaft, a second GT input shaft, a GT output shaft, a first GT intermediate shaft, a second GT intermediate shaft, first speed-change gears, second speed-change gears, a first transmission gear, and a second transmission gear. The first clutch is configured to disable power transmission from the power source to the first GT input shaft. The second clutch is configured to disable power transmission from a CVT output shaft of the continuously variable transmission to the second GT input shaft.

13 Claims, 6 Drawing Sheets

POWER UNIT OF UTILITY VEHICLE

BACKGROUND OF THE INVENTION

Field of the Invention

The present disclosure relates to a power unit of a utility vehicle.

Description of the Related Art

U.S. Pat. No. 8,613,336 B2 discloses a utility vehicle configured to travel on uneven terrains. Such a utility vehicle generally includes a power unit mounted in a vehicle body of the vehicle, the power unit including an engine and a continuously variable transmission (CVT).

Depending on the design requirements for the utility vehicle, it may be desired to widen the gear ratio range of the CVT. However, merely widening the gear ratio range of the CVT causes a gear ratio region where the torque transmission efficiency declines.

SUMMARY OF THE INVENTION

An object of the present disclosure is to offer a wide gear ratio range while maintaining a good torque transmission efficiency and increase the design flexibility of a utility vehicle.

A power unit of a utility vehicle according to an aspect of the present disclosure includes: a power source for travel of the utility vehicle, the power source including a drive shaft that outputs rotational power; a continuously variable transmission including a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley; a gear transmission that receives rotational power output by the power source or the continuously variable transmission; a first clutch interposed between the power source and the gear transmission; a second clutch interposed between the continuously variable transmission and the gear transmission; and an output mechanism that receives rotational power output by the gear transmission and that outputs the rotational power to a drive wheel, wherein the gear transmission includes: a first GT input shaft that receives the rotational power input from the power source; a second GT input shaft that receives the rotational power input from the CVT output shaft; a GT output shaft that outputs the rotational power to the output mechanism; a first GT intermediate shaft that transmits the rotational power from the first GT input shaft to the GT output shaft; a second GT intermediate shaft that transmits the rotational power from the second GT input shaft to the GT output shaft; first speed-change gears mounted on the first GT input shaft and the first GT intermediate shaft; second speed-change gears mounted on the second GT input shaft and the second GT intermediate shaft; a first transmission gear mounted on the first GT intermediate shaft to provide power transmission to the GT output shaft; and a second transmission gear mounted on the second GT intermediate shaft to provide power transmission to the GT output shaft, the first clutch is configured to disable power transmission from the power source to the first GT input shaft, and the second clutch is configured to disable power transmission from the CVT output shaft to the second GT input shaft.

With the above configuration, a first power transmission route leading from the power source to the GT output shaft through the first GT input shaft and first GT intermediate shaft and a second power transmission route leading from the power source to the GT output shaft through the continuously variable transmission, second GT input shaft, and second GT intermediate shaft are connected in parallel, and selective use of the two power transmission routes is enabled by means of the first and second clutches. This makes it possible to widen the gear ratio range of the power unit while ensuring a good torque transmission efficiency. Consequently, the design flexibility of the utility vehicle can be increased.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments according to the present disclosure will be described with reference to the drawings.

First Embodiment

Figure 1:
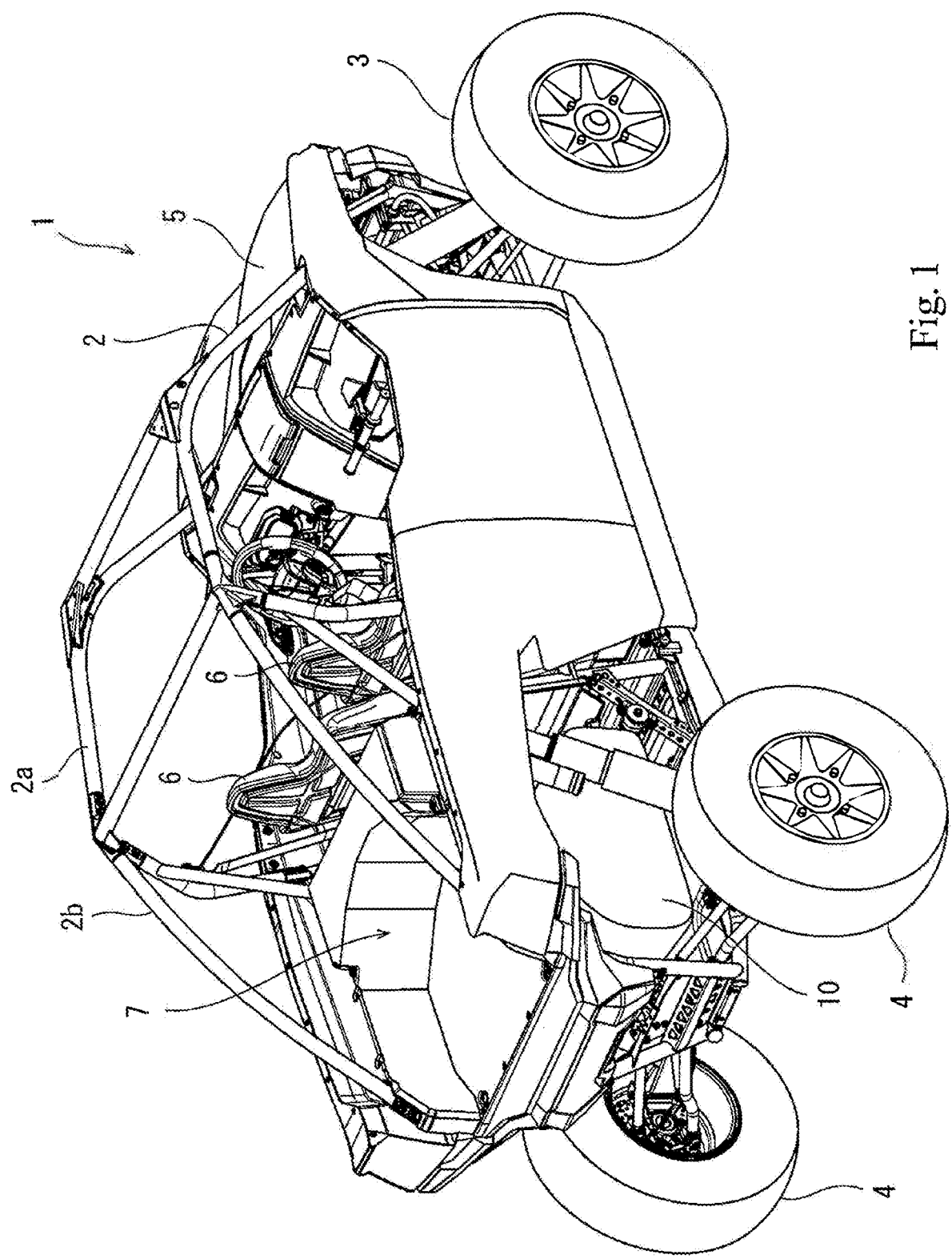
FIG. 1 is a perspective view of a utility vehicle according to a first embodiment.

FIG. 1 is a perspective view of a utility vehicle 1 according to a first embodiment. As shown in FIG. 1, the utility vehicle 1 includes a pair of left and right front wheels 3 supported by a front portion of a vehicle body frame 2 and a pair of left and right rear wheels 4 supported by a rear portion of the vehicle body frame 2. The space between the left and right front wheels 3 is covered from above by a hood 5 made of resin. A pair of occupant seats 6 (driver seat and passenger seat) are disposed rearwardly of the hood 5 and located in the vicinity of the center of the vehicle body frame 2 in a forward/rearward direction.

The vehicle body frame 2 includes a cabin frame part 2a and a pair of left and right rear gusset frame parts 2b. The vehicle body frame 2 is a pipe frame constructed of a plurality of pipe members connected together. The cabin frame part 2a is formed to surround the occupant space in which the occupant seats 6 are disposed. The occupant space surrounded by the cabin frame part 2a is exposed to the outside of the vehicle. The rear gusset frame parts 2b connect an upper portion of the cabin frame part 2a to a rear portion of a rear frame part (not illustrated). A cargo carrier 7 forming a recessed cargo-carrying space is provided rearwardly of the occupant seats 6. Below the cargo carrier 7 is mounted a power unit 10 to be described later (the power unit 10 is omitted in FIG. 1). When the utility vehicle 1 is a two-wheel-drive vehicle, the rear wheels 4 are the drive wheels, and when the utility vehicle 1 is a four-wheel-drive vehicle, the front wheels 3 and the rear wheels 4 are the drive wheels.

Figure 2:
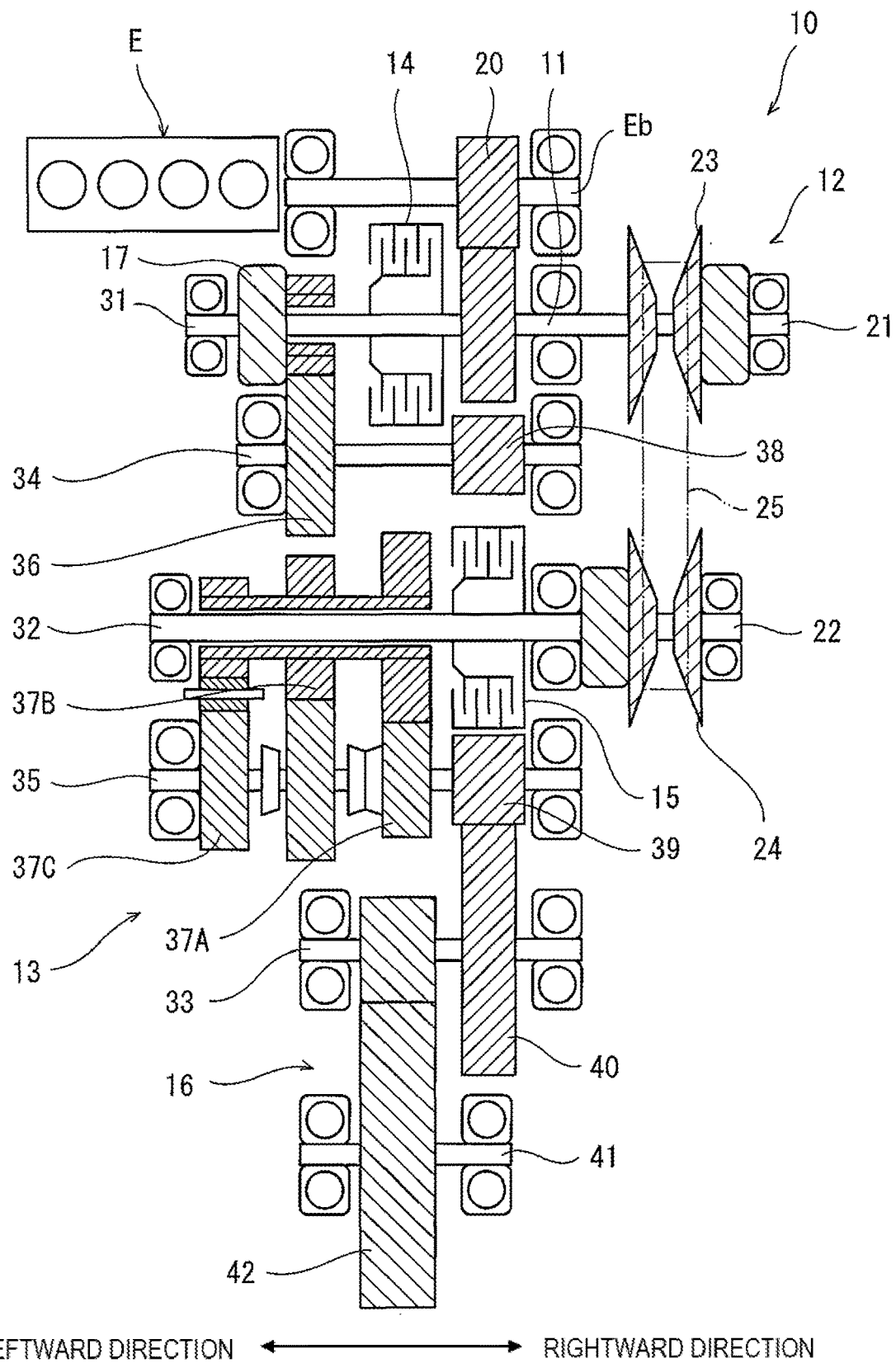
FIG. 2 is a developed view of a power unit of the utility vehicle shown in FIG. 1.

FIG. 2 is a developed view of the power unit 10 of the utility vehicle 1 shown in FIG. 1. As shown in FIG. 2, the power unit 10 includes an engine E (power source for travel of the utility vehicle), a continuously variable transmission 12, a gear transmission 13, a first clutch 14, a second clutch 15, an output mechanism 16, a pump 17, and a power unit case 18. The engine E is a multi-cylinder (e.g., four-cylinder) internal combustion engine. The engine E includes a cylinder unit Ea and a crankshaft Eb (drive shaft) located below the cylinder unit Ea. The crankshaft Eb extends, for example, in a leftward/rightward direction (first direction). The crankshaft Eb outputs rotational power generated by the cylinder unit Ea. An electric motor may be used as the power source instead of the engine (internal combustion engine).

A reduced-speed shaft 11 is disposed parallel to and rearwardly of the crankshaft Eb of the engine E. A speed-reduction gear pair 20 is mounted on the crankshaft Eb and the reduced-speed shaft 11 to transmit the rotation of the crankshaft Eb to the reduced-speed shaft 11 at a reduced rotational speed.

The continuously variable transmission 12 is disposed outwardly of the engine E in the leftward/rightward direction. The continuously variable transmission 12 includes a CVT input shaft 21, a CVT output shaft 22, a drive pulley 23, a driven pulley 24, and a belt 25. The CVT input shaft 21 receives rotational power input from the crankshaft Eb. The CVT input shaft 21 is disposed coaxially with the reduced-speed shaft 11 and corotates with the reduced-speed shaft 11. The CVT input shaft 21 may be connected directly to the reduced-speed shaft 11, may be connected indirectly to the reduced-speed shaft 11, or may be formed integrally with the reduced-speed shaft 11.

The CVT output shaft 22 outputs rotational power to a second GT input shaft 32 of the gear transmission 13 described later. The CVT input shaft 21 and the CVT output shaft 22 extend in the leftward/rightward direction. The drive pulley 23 is mounted on the CVT input shaft 21. The driven pulley 24 is mounted on the CVT output shaft 22. The belt 25 is wound around the drive pulley 23 and driven pulley 24. The belt 25 is made of, for example, a non-metallic material (such as rubber or resin).

The gear transmission 13 is aligned with the continuously variable transmission 12 in the leftward/rightward direction and aligned with the engine E in the forward/rearward direction (second direction). Specifically, the gear transmission 13 is disposed on the left of the continuously variable transmission 12 and rearwardly of the engine E. The gear transmission 13 is a dog clutch transmission. The gear transmission 13 includes a first GT input shaft 31, a second GT input shaft 32, a GT output shaft 33, a first GT intermediate shaft 34, a second GT intermediate shaft 35, a first speed-change gear pair 36, second speed-change gear pairs 37A, 37B, and 37C, a first transmission gear 38, a second transmission gear 39, and a common output gear 40. The first GT input shaft 31, the second GT input shaft 32, the GT output shaft 33, the first GT intermediate shaft 34, and the second GT intermediate shaft 35 extend in the leftward/rightward direction.

The first GT input shaft 31 is disposed coaxially with the reduced-speed shaft 11 and the CVT input shaft 21. The first GT input shaft 31 may be rotatably inserted in the reduced-speed shaft 11. When the first clutch 14 described later is disengaged, the first GT input shaft 31 is rotatable independently of the reduced-speed shaft 11, while when the first clutch 14 described later is engaged, the first GT input shaft 31 corotates with the reduced-speed shaft 11.

The pump 17 is mounted on the first GT input shaft 31. That is, the pump 17 is driven by rotation of the first GT input shaft 31. The pump 17 is, for example, an oil pump for delivering a lubricating oil for lubrication of the engine E and the continuously variable transmission 12. The location of the pump 17 in the leftward/rightward direction overlaps with the location of the crankshaft Eb in the leftward/rightward direction. The pump 17 is mounted on an end of the first GT input shaft 31, the end being remote from the continuously variable transmission 12. Any part of the pump 17 does not project outwardly of the crankshaft Eb in the leftward/rightward direction. When the engine E is used as the power source, the pump 17 may be a water pump for cooling the engine E.

The second GT input shaft 32 receives rotational power input from the CVT output shaft 22. The second GT input shaft 32 is disposed coaxially with the CVT output shaft 22. The CVT output shaft 22 may be rotatably inserted in the second GT input shaft 32. When the second clutch 15 described later is disengaged, the second GT input shaft 32 is rotatable independently of the CVT output shaft 22, while when the second clutch 15 described later is engaged, the second GT input shaft 32 corotates with the CVT output shaft 22.

The GT output shaft 33 outputs rotational power to the output mechanism 16. The first GT intermediate shaft 34 transmits rotational power from the first GT input shaft 31 to the GT output shaft 33. The first GT intermediate shaft 34 is disposed rearwardly of the first GT input shaft 31 and forwardly of the second GT input shaft 32. At least one first speed-change gear pair 36 (in FIG. 2, one first speed-change gear pair 36) is mounted on the first GT input shaft 31 and the first GT intermediate shaft 34.

The first clutch 14 is mounted around the axis of the first GT input shaft 31. The first clutch 14 is interposed between the engine E and the gear transmission 13. The first clutch 14 is configured to disable and enable power transmission from the reduced-speed shaft 11 to the first GT input shaft 31. The first clutch 14 is, for example, a multi-plate clutch. The first clutch 14 is disposed between the speed-reduction gear pair 20 and the first speed-change gear pair 36 in the leftward/rightward direction.

The second GT intermediate shaft 35 transmits rotational power from the second GT input shaft 32 to the GT output shaft 33. The second GT intermediate shaft 35 is disposed rearwardly of the second GT input shaft 32. On the second GT input shaft 32 and the second GT intermediate shaft 35 are mounted a plurality of (e.g., three) second speed-change gear pairs 37A, 37B, and 37C.

The second clutch 15 is mounted around the axis of the second GT input shaft 32. The second clutch 15 is interposed between the continuously variable transmission 12 and the gear transmission 13. The second clutch 15 is configured to disable and enable power transmission from the CVT output shaft 22 to the second GT input shaft 32. The second clutch 15 is, for example, a multi-plate clutch. The second clutch 15 is disposed between the driven pulley 24 and the second speed-change gear pairs 37A, 37B, and 37C in the leftward/rightward direction. The location of the second clutch 15 in the leftward/rightward direction overlaps with the location of the second transmission gear 39 in the leftward/rightward direction.

When the first clutch 14 is in an engaged state and the second clutch 15 is in a disengaged state, rotational power transmitted from the crankshaft Eb to the reduced-speed shaft 11 is transmitted to the first GT input shaft 31, undergoes a speed change provided by the first speed-change gear pair 36, and is then transmitted to the GT output shaft 33. Meanwhile, rotational power transmitted from the reduced-speed shaft 11 to the CVT input shaft 21 is cut off by the second clutch 15 and is not transmitted to the second GT input shaft 32.

When the first clutch 14 is in a disengaged state and the second clutch 15 is in an engaged state, rotational power transmitted from the crankshaft Eb to the reduced-speed shaft 11 is transmitted to the continuously variable transmission 12, undergoes a continuous speed change, and is then transmitted to the second GT input shaft 32. Meanwhile, rotational power of the reduced-speed shaft 11 is cut off by the first clutch 14 and is not transmitted to the first GT input shaft 31. The rotation of the second GT input shaft 32 undergoes a speed change provided by any of the second speed-change gear pairs 37A, 37B, and 37C and is then transmitted to the GT output shaft 33. For example, when the continuously variable transmission 12 is in operation for speed change, the second speed-change gear pairs 37A, 37B, and 37C correspond to a "low gear position", a "high gear position", and a "reverse position", respectively. The first speed-change gear pair 36 corresponds to a gear position used at lower speeds than the low gear position, a gear position between the low and high gear positions, or a gear position used at higher speeds than the high gear position. The correspondence relationship between the gear pairs and the gear positions is not limited to this example.

The first transmission gear 38 is mounted on the first GT intermediate shaft 34 so as to corotate with the first GT intermediate shaft 34. The second transmission gear 39 is mounted on the second GT intermediate shaft 35 so as to corotate with the second GT intermediate shaft 35. The common output gear 40 is mounted on the GT output shaft 33 so as to corotate with the GT output shaft 33. The first transmission gear 38 and the second transmission gear 39 are aligned with each other in the forward/rearward direction and are in mesh with the common output gear 40.

That is, the rotation of the first GT intermediate shaft 34 is transmitted to the GT output shaft 33 via the first transmission gear 38 and the common output gear 40, and the rotation of the second GT intermediate shaft 35 is transmitted to the GT output shaft 33 via the second transmission gear 39 and the common output gear 40. Thus, a first speed change route passing through the first GT input shaft 31 and first GT intermediate shaft 34 and a second speed change route passing through the continuously variable transmission 12, second GT input shaft 32, and second GT intermediate shaft 35 are arranged in parallel between the reduced-speed shaft 11 and the GT output shaft 33. That is, the rotation of the GT input shaft 31 is transmitted to the GT output shaft 33 through either the first speed change route or the second speed change route.

The output mechanism 16 receives rotational power output by the gear transmission 13 and outputs the rotational power to the drive wheels (front wheels 3 and/or rear wheels 4). The output mechanism 16 includes a final shaft 41 disposed parallel to the GT output shaft 33 and a final gear pair 42 mounted on the GT output shaft 33 and final shaft 41. The final shaft 41 and final gear pair 42 are disposed rearwardly of the GT output shaft 33.

The speed-reduction gear pair 20, first transmission gear 38, second clutch 15, second transmission gear 39, and common output gear 40 are arranged in such a manner that their locations in the leftward/rightward direction overlap with one another (their locations in the leftward/rightward direction coincide with one another in FIG. 2). The first clutch 14, second speed-change gear pair 37A, and final gear pair 42 are arranged in such a manner that their locations in the leftward/rightward direction overlap with one another (their locations in the leftward/rightward direction coincide with one another in FIG. 2). The first speed-change gear pair 36 and second speed-change gear pair 37B are arranged in such a manner that their locations in the leftward/rightward direction overlap with each other (their locations in the leftward/rightward direction coincide with each another in FIG. 2). The pump 17 and second speed-change gear pair 37C are arranged in such a manner that their locations in the leftward/rightward direction overlap with each other. That is, in the example of FIG. 2, the gear transmission 13 includes four gear trains.

Figure 3:
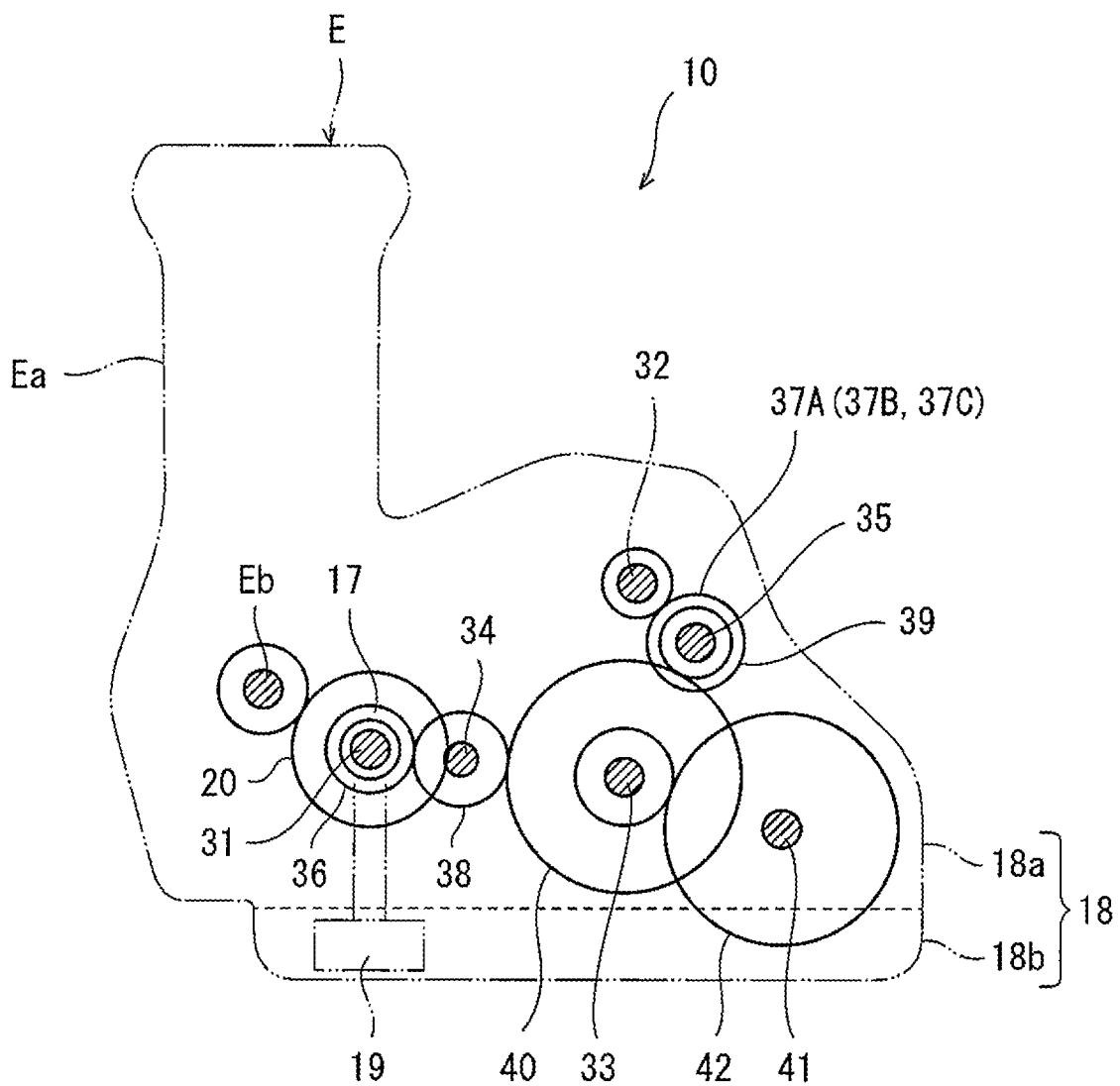
FIG. 3 is a side view of the power unit shown in FIG. 2.

FIG. 3 is a side view of the power unit 10 shown in FIG. 2. As shown in FIG. 3, the power unit 10 includes a power unit case 18 continuous with the rear of the engine E. The power unit case 18 houses the crankshaft Eb, the reduced-speed shaft 11, the continuously variable transmission 12, the gear transmission 13, the first clutch 14, the second clutch 15, the output mechanism 16, and the pump 17. The power unit case 18 includes a case body 18a and an oil pan 18b provided below the case body 18a. The oil pan 18b reserves a lubricating oil, and the lubricating oil is sucked up by the action of suction force of the pump 17 through a strainer 19.

The first GT input shaft 31, and therefore the reduced-speed shaft 11 and CVT input shaft 21, are disposed rearwardly of the crankshaft Eb. The first GT input shaft 31 is disposed below the crankshaft Eb. The second GT input shaft 32, and therefore the CVT output shaft 22, are disposed rearwardly of the first GT input shaft 31 and CVT input shaft 21. The second GT input shaft 32 is disposed above the crankshaft Eb. The first GT intermediate shaft 34 is disposed rearwardly of the first GT input shaft 31. The first GT intermediate shaft 34 is disposed below the first GT input shaft 31. The second GT intermediate shaft 35 is disposed below the second GT input shaft 32. The second GT intermediate shaft 35 is disposed above the crankshaft Eb and the first GT input shaft 31.

The GT output shaft 33 is disposed below the second GT intermediate shaft 35. The GT output shaft 33 is disposed rearwardly of the first GT intermediate shaft 34. The GT output shaft 33 is disposed forwardly of the first GT intermediate shaft 34. The GT output shaft 33 is disposed below the crankshaft Eb. The final shaft 41 is disposed rearwardly of and below the GT output shaft 33. The speed-reduction gear pair 20 and common output gear 40 are disposed above the oil pan 18b. A part of the final gear pair 42 lies within the oil pan 18b.

Figure 4:
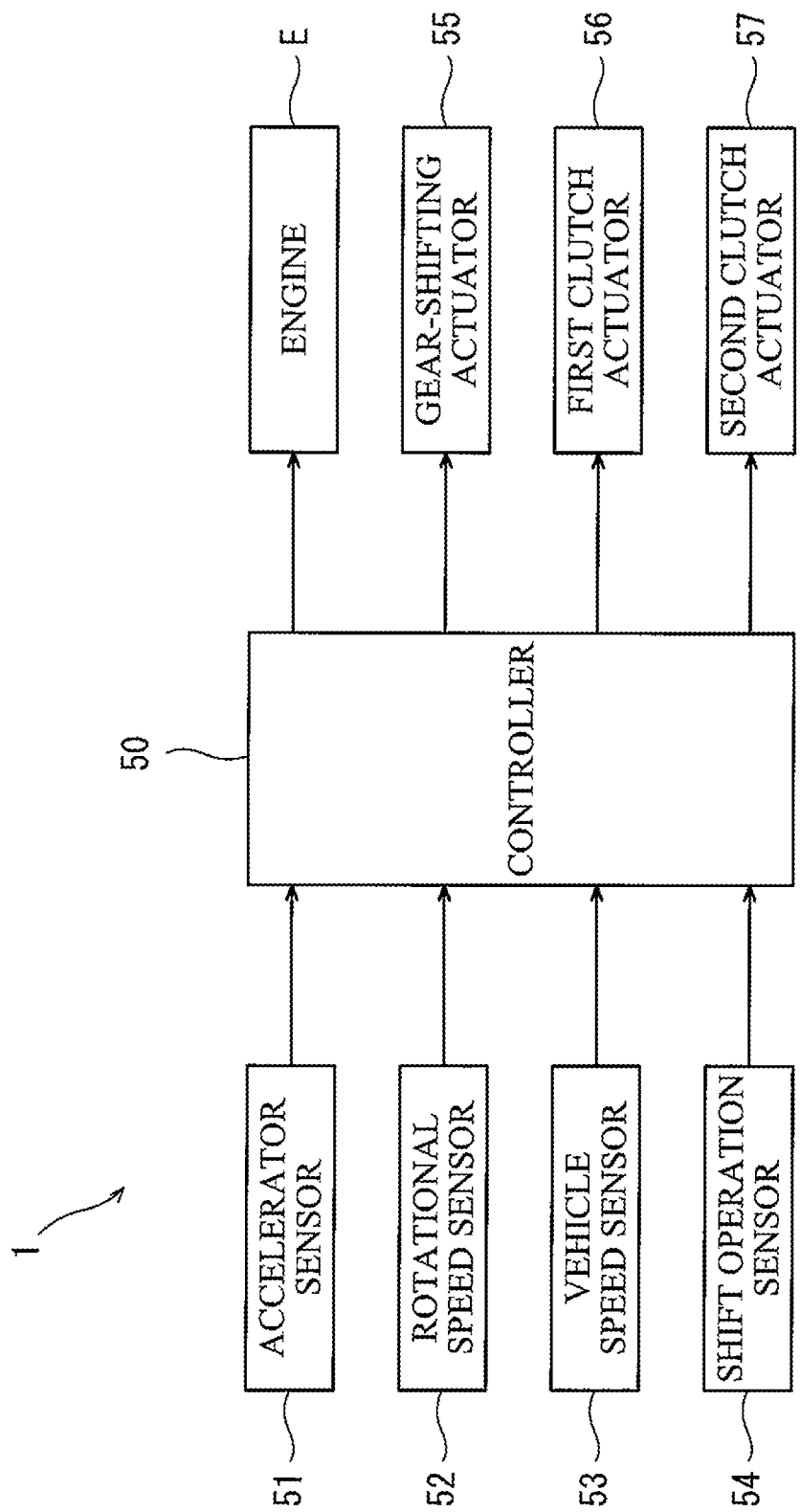
FIG. 4 is a block diagram of a control system of the utility vehicle shown in FIG. 1.

FIG. 4 is a block diagram of a control system of the utility vehicle 1 shown in FIG. 1. The utility vehicle 1 includes a controller 50. The utility vehicle 1 includes an accelerator sensor 51, a rotational speed sensor 52, a vehicle speed sensor 53, and a shift operation sensor 54, which are provided on the input side of the controller 50. The accelerator sensor 51 is a sensor that detects the amount of operation of an acceleration operation member (e.g., an accelerator pedal) by a driver. The rotational speed sensor 52 is a sensor that detects the engine speed (in particular the rotational speed of the crankshaft Eb). The vehicle speed sensor 53 is a sensor that detects the travel speed of the utility vehicle 1. The shift operation sensor 54 is a sensor that detects the position of a gear-shifting operation member (e.g., a shift lever) operated by the driver (gear position command).

The utility vehicle 1 includes the engine E, a gear-shifting actuator 55, a first clutch actuator 56, and a second clutch actuator 57, which are provided on the output side of the controller 50. The gear-shifting actuator 55 generates gear-shifting power for the gear transmission 13. That is, the gear-shifting actuator 55 rotationally drives a shift drum (not illustrated) to move shift forks (not illustrated) and hence dogs (not illustrated), thereby accomplishing a gear-shifting process. The gear-shifting actuator 55 is, for example, an electric motor. The first clutch actuator 56 generates power for actuating the first clutch 14. The second clutch actuator 57 generates power for actuating the second clutch 15. For example, the first and second clutches 14 and 15 are clutches actuated by hydraulic pressure, and the first and second clutch actuators 56 and 57 are hydraulic pumps.

The controller 50 controls the engine E based on detection signals received from the accelerator sensor 51, rotational speed sensor 52, and vehicle speed sensor 53. The controller 50 controls the gear-shifting actuator 55, first clutch actuator 56, and second clutch actuator 57 based on detection signals received from the shift operation sensor 54. Upon receiving a neutral position command from the shift operation sensor 54, the controller 50 controls the first and second clutch actuators 56 and 57 to bring the first and second clutches 14 and 15 into a disengaged state.

Upon receiving a gear position command from the shift operation sensor 54, the controller 50 controls the first and second clutch actuators 56 and 57 to bring the first and second clutches 14 and 15 into a disengaged state. Subsequently, the controller 50 controls the gear-shifting actuator 55 in such a manner that a desired speed-change gear pair is selected from the first speed-change gear pair 36 and second speed-change gear pairs 37A, 37B, and 37C. Next, the controller 50 controls the first clutch actuator 56 or the second clutch actuator 57 in such a manner that one of the first and second clutches 14 and 15 that is located upstream of the selected speed-change gear pair is brought back into an engaged state. That is, the other of the first and second clutches 14 and 15, which is not located upstream of the selected speed-change gear pair, remains in a disengaged state.

With the configuration described above, a first power transmission route leading from the engine E to the GT output shaft 33 through the first GT input shaft 31 and first GT intermediate shaft 34 and a second power transmission route leading from the engine E to the GT output shaft 33 through the continuously variable transmission 12, second GT input shaft 32, and second GT intermediate shaft 35 are connected in parallel, and selective use of the two power transmission routes is enabled by means of the first and second clutches 14 and 15. This makes it possible to widen the gear ratio range of the power unit 10 while ensuring a good torque transmission efficiency. Consequently, the design flexibility of the utility vehicle 1 can be increased.

Additionally, since the plurality of GT input shafts 31 and 32 and the plurality of GT intermediate shafts 34 and 35, which are provided in the gear transmission 13, are arranged in a carefully designed layout, the power unit 10 can be made compact in the leftward/rightward direction.

Additionally, since the crankshaft Eb, CVT input shaft 21, CVT output shaft 22, first GT input shaft 31, second GT input shaft 32, GT output shaft 33, first GT intermediate shaft 34, and second GT intermediate shaft 35 are arranged as shown in FIG. 3, the power unit 10 can be made compact in the forward/rearward direction by virtue of the carefully designed layout of these shafts.

Additionally, since the first transmission gear 38 and second transmission gear 39 are aligned with each other in the forward/rearward direction and are in mesh with the common output gear 40, the size of the space occupied by the first transmission gear 38, second transmission gear 39, and common output gear 40 can be reduced in the leftward/rightward direction, and the power unit 10 can be made compact in the leftward/rightward direction.

Additionally, since the location of the pump 17 in the leftward/rightward direction overlaps with the location of the crankshaft Eb in the leftward/rightward direction, the pump 17 is disposed with high space efficiency, and the power unit 10 can be made compact in the leftward/rightward direction.

Additionally, since the state of the first and second clutches 14 and 15 is selectively switched under control of the controller, selection of a desired gear pair from the first speed-change gear pair 36 and second speed-change gear pairs 37A, 37B, and 37C can be easily and properly made to accomplish gear shifting.

Additionally, since the controller 50, upon receiving a neutral position command from the shift operation sensor 54, controls the first and clutch actuators 56 and 57 to bring the first and second clutches 14 and 15 into a disengaged state, shifting to the neutral position can be achieved while the route of power transmission from the engine E to the continuously variable transmission 12 is left in a power transmission state. This eliminates the need for a centrifugal clutch interposed between the engine E and the continuously variable transmission 12, thereby preventing an increase in the number of components.

Second Embodiment

Figure 5:
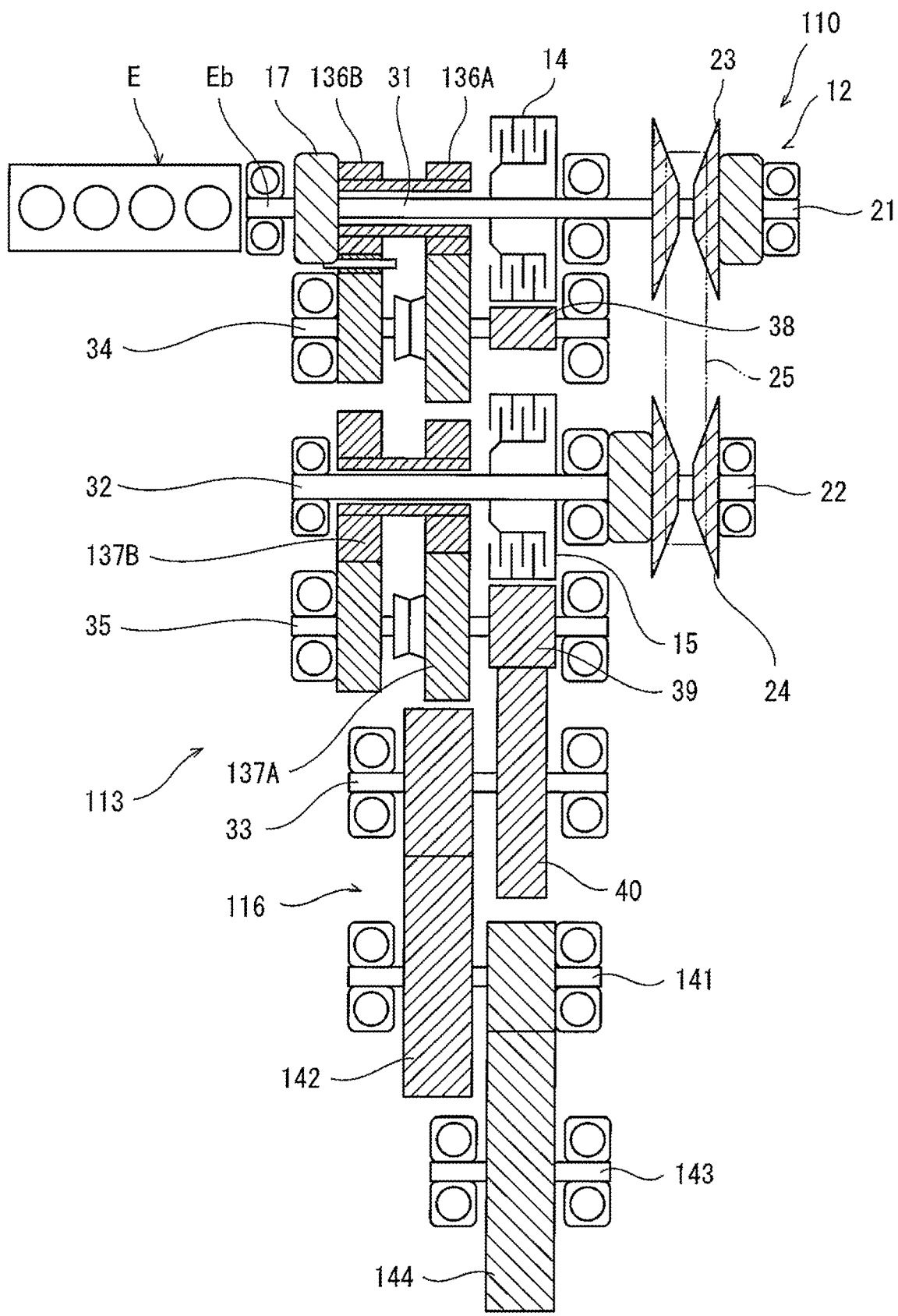
FIG. 5 shows a power unit of a second embodiment in the same manner as FIG. 2 shows the power unit of the first embodiment.

FIG. 5 shows a power unit 110 of a second embodiment in the same manner as FIG. 2 shows the power unit of the first embodiment. The elements identical to those of the first embodiment are denoted by the same reference signs and will not be described again. As shown in FIG. 5, the power unit 110 of the second embodiment does not include the reduced-speed shaft 11 and speed-reduction gear pair 20 (see FIG. 2) included in the power unit of the first embodiment. The first GT input shaft 31 of a gear transmission 113 is disposed coaxially with the crankshaft Eb and corotates with the crankshaft Eb. The first GT input shaft 31 may be connected directly to the crankshaft Eb, may be connected indirectly to the crankshaft Eb, or may be formed integrally with the crankshaft Eb. On the first GT input shaft 31 is mounted the pump 17.

The CVT input shaft 21 of the continuously variable transmission 12 is disposed coaxially with the first GT input shaft 31. The CVT input shaft 21 may be rotatably inserted in the first GT input shaft 31. When the first clutch 14 is disengaged, the CVT input shaft 21 is rotatable independently of the first GT input shaft 31, while when the first clutch 14 is engaged, the CVT input shaft 21 corotates with the first GT input shaft 31.

A plurality of first speed-change gear pairs 136A and 136B (two gear pairs in FIG. 5) are mounted on the first GT input shaft 31 and first GT intermediate shaft 34. A plurality of second speed-change gear pairs 137A and 137B (two gear pairs in FIG. 5) are mounted on the second GT input shaft 32 and second GT intermediate shaft 35. The location of the first clutch 14 in the leftward/rightward direction overlaps with the location of the first transmission gear 38 in the leftward/rightward direction. Since the first clutch 14 is disposed with high space efficiency, the power unit 10 can be made compact in the leftward/rightward direction despite the mounting of the plurality of first speed-change gear pairs 136A and 136B on the first GT intermediate shaft 34.

An output mechanism 116 includes a pre-final shaft 141 disposed parallel to the GT output shaft 33, a pre-final gear pair 142 mounted on the GT output shaft 33 and pre-final shaft 141, a final shaft 143 disposed parallel to the pre-final shaft 141, and a final gear pair 144 mounted on the pre-final shaft 141 and final shaft 143. The pre-final shaft 141 is disposed rearwardly of the GT output shaft 33, and the final shaft 143 is disposed rearwardly of the pre-final shaft 141. The gears of the pre-final gear pair 142 and final gear pair 144 are speed-reduction gears. That is, speed-reduction gears are disposed downstream of the GT output shaft 33 in the power transmission route instead of disposing speed-reduction gears between the crankshaft Eb and the CVT input shaft 21. The other elements are the same as those of the first embodiment described above and will therefore not be described again.

Third Embodiment

Figure 6:
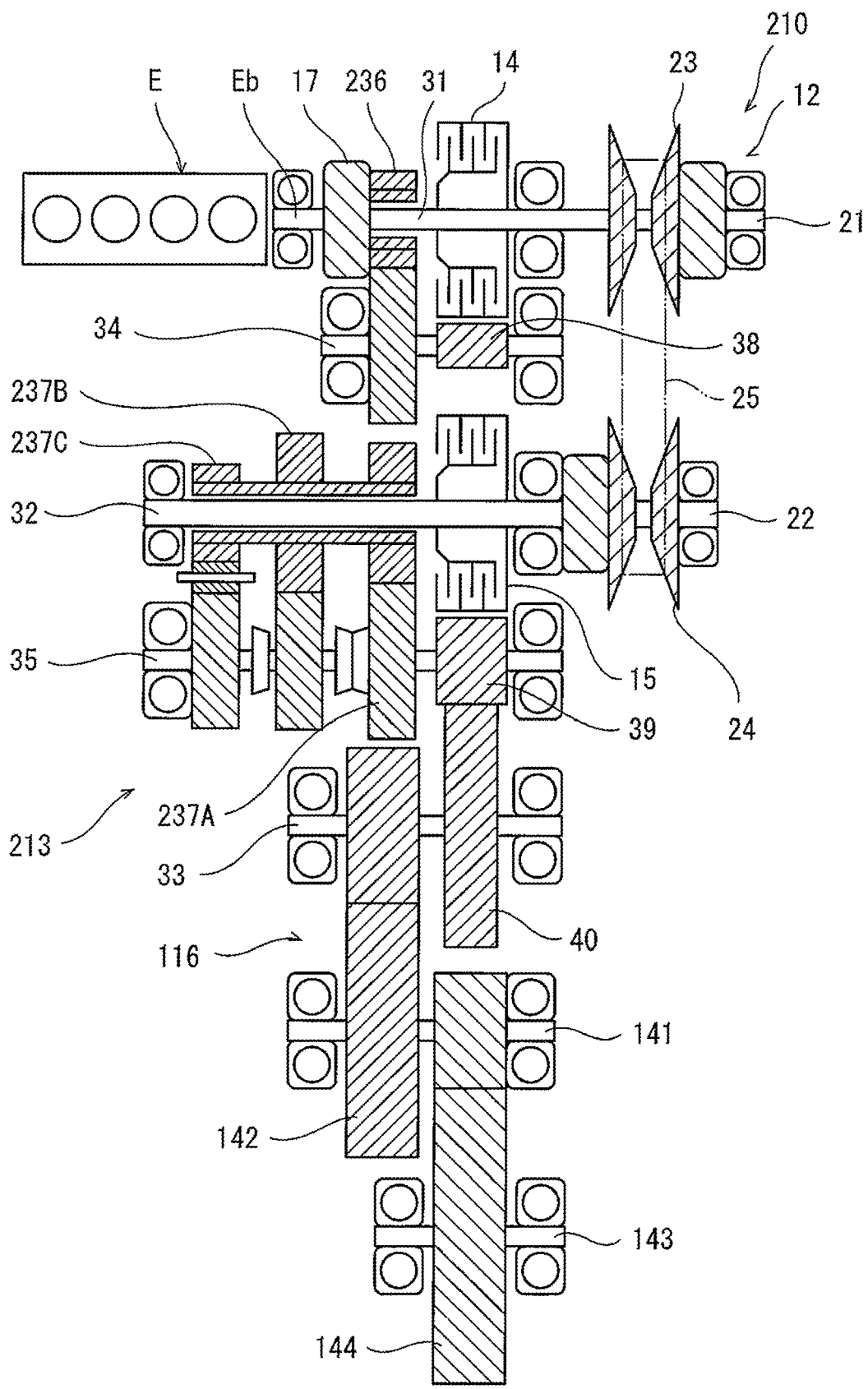
FIG. 6 shows a power unit of a third embodiment in the same manner as FIG. 2 shows the power unit of the first embodiment.

FIG. 6 shows a power unit 210 of a third embodiment in the same manner as FIG. 2 shows the power unit of the first embodiment. The elements identical to those of the first or second embodiment are denoted by the same reference signs and will not be described again. As seen from FIG. 6, the difference of the power unit 210 of the third embodiment from the power unit of the second embodiment lies in how speed-change gear pairs are arranged.

One first speed-change gear pair 236 is mounted on the first GT input shaft 31 and first GT intermediate shaft 34. On the second GT input shaft 32 and second GT intermediate shaft 35 are mounted three second speed-change gear pairs 237A, 237B, and 237C. For example, the second speed-change gear pair 237A corresponds to a "low gear position", the second speed-change gear pair 237B corresponds to a "high gear position", and the second speed-change gear pair 237C corresponds to a "reverse position". The first speed-change gear pair 236 corresponds to a gear position used at lower speeds than the low gear position, a gear position between the low and high gear positions, or a gear position used at higher speeds than the high gear position. The correspondence relationship between the gear pairs and the gear positions is not limited to this example. The other elements are the same as those of the first or second embodiment described above and will therefore not be described again.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A power unit of a utility vehicle, comprising:
    a power source for travel of the utility vehicle, the power source comprising a drive shaft that outputs rotational power;
    a continuously variable transmission comprising a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley;
    a gear transmission that receives rotational power output by the power source or the continuously variable transmission;
    a first clutch interposed between the power source and the gear transmission;
    a second clutch interposed between the continuously variable transmission and the gear transmission; and
    an output mechanism that receives rotational power output by the gear transmission and that outputs the rotational power to a drive wheel, wherein
    the gear transmission comprises:
        a first GT input shaft that receives the rotational power input from the power source;
        a second GT input shaft that receives the rotational power input from the CVT output shaft;
        a GT output shaft that outputs the rotational power to the output mechanism;
        a first GT intermediate shaft that transmits the rotational power from the first GT input shaft to the GT output shaft;
        a second GT intermediate shaft that transmits the rotational power from the second GT input shaft to the GT output shaft;
        first speed-change gears mounted on the first GT input shaft and the first GT intermediate shaft;
        second speed-change gears mounted on the second GT input shaft and the second GT intermediate shaft;
        a first transmission gear mounted on the first GT intermediate shaft to provide power transmission to the GT output shaft; and
        a second transmission gear mounted on the second GT intermediate shaft to provide power transmission to the GT output shaft,
    the first clutch is configured to disable power transmission from the power source to the first GT input shaft,
    the second clutch is configured to disable power transmission from the CVT output shaft to the second GT input shaft,
    the drive shaft, the CVT input shaft, the CVT output shaft, the first GT input shaft, the second GT input shaft, the first GT intermediate shaft, the second GT intermediate shaft, and the GT output shaft extend in a first direction,
    the gear transmission is aligned with the continuously variable transmission in the first direction and aligned with the power source in a second direction perpendicular to the first direction,
    the first GT input shaft is disposed coaxially with the CVT input shaft, and
    the second GT input shaft is disposed coaxially with the CVT output shaft.

2. The power unit according to claim 1, wherein
    the drive shaft, the first GT input shaft, and the second GT input shaft are arranged in this order on one side of the power unit in the second direction,
    the first GT input shaft is disposed below the drive shaft,
    the second GT input shaft is disposed above the drive shaft, and
    the first GT intermediate shaft and the second GT intermediate shaft are disposed below the second GT input shaft, and
    the GT output shaft is disposed below the second GT intermediate shaft.

3. The power unit according to claim 1, wherein
the gear transmission comprises a common output gear mounted on the GT output shaft, and
the first transmission gear and the second transmission gear are aligned with each other in the second direction and are in mesh with the common output gear.

4. The power unit according to claim 1, wherein
the first clutch is mounted around an axis of the first GT input shaft, and
the location of the first clutch in the first direction overlaps with the location of the first transmission gear in the first direction.

5. The power unit according to claim 1, wherein
the second clutch is mounted around an axis of the second GT input shaft, and
the location of the second clutch in the first direction overlaps with the location of the second transmission gear in the first direction.

6. The power unit according to claim 1, further comprising:
a first clutch actuator that actuates the first clutch;
a second clutch actuator that actuates the second clutch; and
a controller that controls the first clutch actuator and the second clutch actuator.

7. The power unit according to claim 6, wherein the controller, upon receiving a predetermined neutral position command, controls the first clutch actuator and the second clutch actuator to bring the first clutch and the second clutch into a disengaged state.

8. The power unit according to claim 1, wherein the first direction is a leftward and rightward direction of the utility vehicle.

9. The power unit according to claim 1, wherein the gear transmission is disposed rearwardly of the power source.

10. The power unit according to claim 1, wherein the GT output shaft is aligned with the CVT output shaft in the first direction.

11. The power unit according to claim 1, wherein the CVT output shaft is aligned with the power source in the second direction.

12. A power unit of a utility vehicle, comprising:
a power source for travel of the utility vehicle, the power source comprising a drive shaft that outputs rotational power;
a continuously variable transmission comprising a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley;
a gear transmission that receives rotational power output by the power source or the continuously variable transmission;
a first clutch interposed between the power source and the gear transmission;
a second clutch interposed between the continuously variable transmission and the gear transmission; and
an output mechanism that receives rotational power output by the gear transmission and that outputs the rotational power to a drive wheel, wherein
the gear transmission comprises:
a first GT input shaft that receives the rotational power input from the power source;
a second GT input shaft that receives the rotational power input from the CVT output shaft;
a GT output shaft that outputs the rotational power to the output mechanism;
a first GT intermediate shaft that transmits the rotational power from the first GT input shaft to the GT output shaft;
a second GT intermediate shaft that transmits the rotational power from the second GT input shaft to the GT output shaft;
first speed-change gears mounted on the first GT input shaft and the first GT intermediate shaft;
second speed-change gears mounted on the second GT input shaft and the second GT intermediate shaft;
a first transmission gear mounted on the first GT intermediate shaft to provide power transmission to the GT output shaft; and
a second transmission gear mounted on the second GT intermediate shaft to provide power transmission to the GT output shaft,
the first clutch is configured to disable power transmission from the power source to the first GT input shaft,
the second clutch is configured to disable power transmission from the CVT output shaft to the second GT input shaft,
the drive shaft, the CVT input shaft, the CVT output shaft, the first GT input shaft, the second GT input shaft, the first GT intermediate shaft, the second GT intermediate shaft, and the GT output shaft extend in a first direction,
the power unit further comprises:
speed-reduction gears that transmit rotational power of the drive shaft of the power source to the first GT input shaft; and
a pump mounted on the first GT input shaft,
the first GT input shaft is aligned with the drive shaft in a second direction perpendicular to the first direction, and
the location of the pump in the first direction overlaps with the location of the power source in the first direction.

13. A power unit of a utility vehicle,
a power source for travel of the utility vehicle, the power source comprising a drive shaft that outputs rotational power;
a continuously variable transmission comprising a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley;
a gear transmission that receives rotational power output by the power source or the continuously variable transmission;
a first clutch interposed between the power source and the gear transmission;
a second clutch interposed between the continuously variable transmission and the gear transmission; and
an output mechanism that receives rotational power output by the gear transmission and that outputs the rotational power to a drive wheel, wherein
the gear transmission comprises:
a first GT input shaft that receives the rotational power input from the power source;
a second GT input shaft that receives the rotational power input from the CVT output shaft;
a GT output shaft that outputs the rotational power to the output mechanism;

a first GT intermediate shaft that transmits the rotational power from the first GT input shaft to the GT output shaft;
a second GT intermediate shaft that transmits the rotational power from the second GT input shaft to the GT output shaft;
first speed-change gears mounted on the first GT input shaft and the first GT intermediate shaft;
second speed-change gears mounted on the second GT input shaft and the second GT intermediate shaft;
a first transmission gear mounted on the first GT intermediate shaft to provide power transmission to the GT output shaft; and
a second transmission gear mounted on the second GT intermediate shaft to provide power transmission to the GT output shaft, the first clutch is configured to disable power transmission from the power source to the first GT input shaft, the second clutch is configured to disable power transmission from the CVT output shaft to the second GT input shaft, and the GT output shaft is disposed below the drive shaft of the power source.

\* \* \* \* \*